(12) United States Patent
Pfau

(10) Patent No.: US 9,747,619 B2
(45) Date of Patent: Aug. 29, 2017

(54) ENGINE, SYSTEM AND METHOD OF PROVIDING APPLICATION AND ANALYTIC SERVICES ACROSS DIVERSE OPERATING PLATFORMS

(71) Applicant: Gunter Pfau, Philadelphia, PA (US)

(72) Inventor: Gunter Pfau, Philadelphia, PA (US)

(73) Assignee: Stuzo, LLC, Philadelphia, PA (US)

( * ) Notice: Subject to any disclaimer, the term of this patent is extended or adjusted under 35 U.S.C. 154(b) by 312 days.

(21) Appl. No.: 14/477,649

(22) Filed: Sep. 4, 2014

(65) Prior Publication Data
US 2015/0065098 A1   Mar. 5, 2015

Related U.S. Application Data

(60) Provisional application No. 61/873,667, filed on Sep. 4, 2013.

(51) Int. Cl.
| | | |
|---|---|---|
| G06Q 30/02 | (2012.01) | |
| H04W 4/02 | (2009.01) | |
| H04W 4/00 | (2009.01) | |

(52) U.S. Cl.
CPC ........ *G06Q 30/0277* (2013.01); *H04W 4/001* (2013.01); *H04W 4/02* (2013.01)

(58) Field of Classification Search
CPC ..... G06Q 30/0277; H04W 4/001; H04W 4/02
USPC ........................................ 455/414.1; 717/174
See application file for complete search history.

(56) References Cited

U.S. PATENT DOCUMENTS

| | | | |
|---|---|---|---|
| 6,950,441 B1* | 9/2005 | Kaczmarczyk | H04L 69/08 370/352 |
| 7,895,651 B2* | 2/2011 | Brennan | G06F 21/55 705/51 |
| 9,003,457 B2* | 4/2015 | Mule | G06T 11/80 725/10 |
| 2006/0122987 A1* | 6/2006 | Angelo | G06F 17/3089 |
| 2009/0164564 A1* | 6/2009 | Willis | G06F 17/30884 709/203 |
| 2010/0098100 A1* | 4/2010 | Takahashi | H04L 65/103 370/401 |

\* cited by examiner

*Primary Examiner* — John Chavis
(74) *Attorney, Agent, or Firm* — Dilworth Paxson LLP

(57) ABSTRACT

A system and method for providing a media engagement gateway (MEG) for providing application and analytic services across diverse operating platforms is disclosed.

6 Claims, 30 Drawing Sheets

Present Information within relative size parameters

ENGINE, SYSTEM AND METHOD OF PROVIDING APPLICATION AND ANALYTIC SERVICES ACROSS DIVERSE OPERATING PLATFORMS

CROSS-REFERENCE TO RELATED APPLICATION

This application claims priority to U.S. Provisional Patent Application No. 61/873,667, filed Sep. 4, 2013, entitled "Engine, System and Method of Providing Application and Analytic Services Across Diverse Operating Platforms", which application is incorporated in its entirety herein.

BACKGROUND

Field of the Invention

The present invention relates to the use of a media engagement gateway (MEG), and, more particularly, to an engine, system and method of providing application and analytic services across diverse operating platforms.

Background of the Invention

The number of unique operating systems, device types, and communication pathways accessible through an internet or wireless connection has continued to grow and presents to advertisers and other distributors of information the difficult task of continually updating software and computer based interfaces to maintain connectivity with the ever changing landscape of consumer devices. This vigilance is time consuming and costly and delays the ability of a potential advertiser, for example, to distribute information. Thus, there exists a need for an engine, method, and system of engagement with various devices or platforms that enables both unsophisticated and sophisticated app producers to configure, deploy, and in real-time record the results of a multitude of apps to consumers across target app devices.

SUMMARY

The present invention includes at least a computer-implemented engine, system and method for providing application and analytic services across diverse operating platforms. It is to be understood that both the foregoing general description and the following detailed description are exemplary and explanatory, and are intended to provide further explanation of the invention as discussed hereinthroughout.

BRIEF DESCRIPTION OF THE DRAWINGS

The accompanying drawings are included to provide a further understanding of the disclosed embodiments. In the drawings, like numerals represent like elements, and.

DETAILED DESCRIPTION

Figure 1:
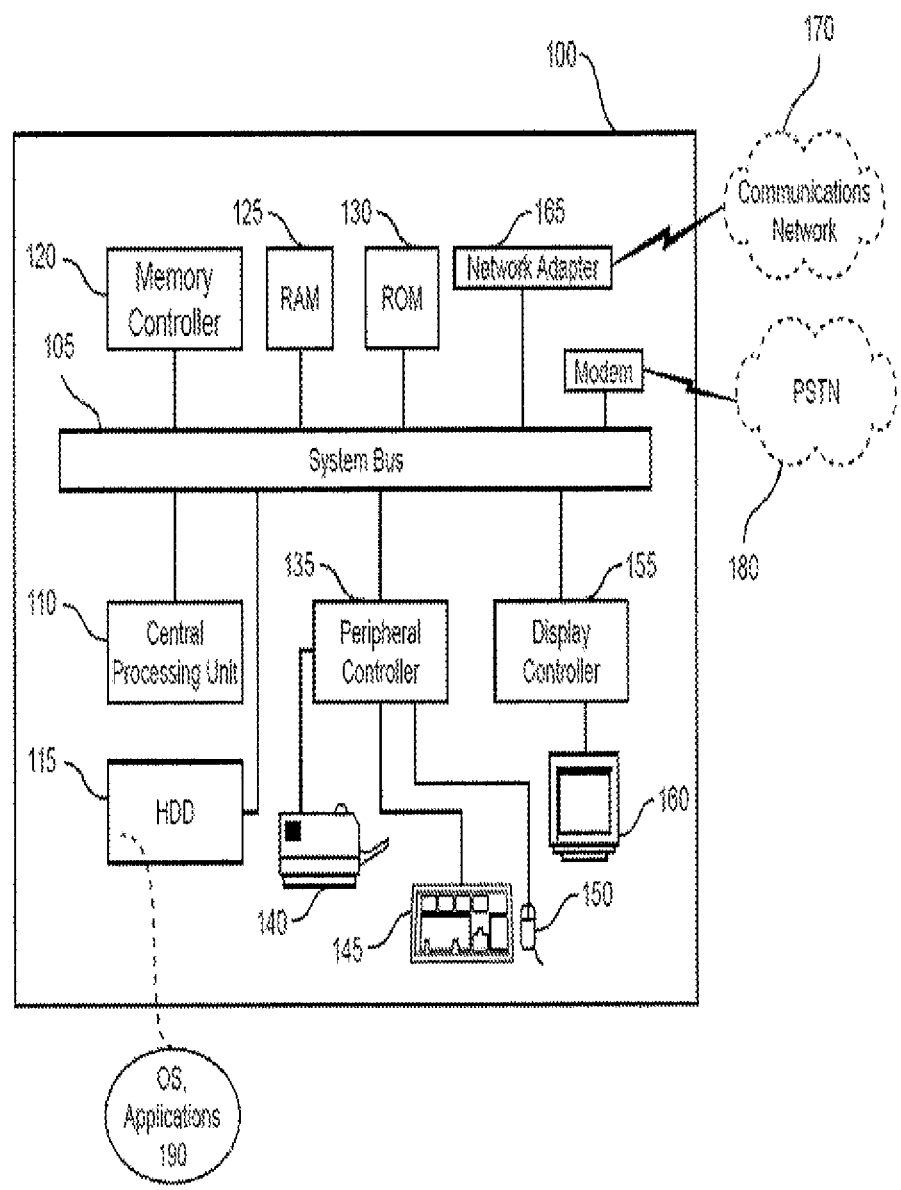
FIG. 1 illustrates an aspect of an exemplary embodiment of the present invention.

It is to be understood that the figures and descriptions of the present invention have been simplified to illustrate elements that are relevant for a clear understanding of the present invention, while eliminating, for the purpose of clarity, many other elements found in similar apparatuses, systems, and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to the disclosed elements and methods known to those skilled in the art.

Companies, organizations, brands, and/or individuals (individually and collectively referred to as app producers) produce software applications (hereinafter also referred to as applications or apps) for use on or off of the Internet for both business and non-business end users/consumers for fun and profit. App producers may be highly sophisticated and may have access to a bevy of resources, such as companies on the Forbes Global 2,000 list. App producers may also be unsophisticated, such as small local businesses, a graphic designer, an independent/inexperienced programmer, or non-profit organizations.

An app consumer who is targeted may be a highly sophisticated "early adapter" who can manage and appreciate the value of a wide variety of complicated apps, such as a digital project manager. Alternatively, the targeted app Consumer may be an unsophisticated "late adapter" who is not adept at using a mobile device and who may have trouble navigating the Internet, such as digital project manager's grandparents.

Many apps released are not configured to work on every device and may suffer compatibility problems. App producers thus generally need to develop apps for multiple channels. These apps may run on native operating systems, such as iOS and Android, apps that run on websites, apps that run and/or are accessed on social networks such as Facebook and Twitter, or apps that appear at specified locations inside of a store or any other place in the real world. These various apps may be envisioned as "channels" dedicated to the foregoing functions stated in relation to each app type, and targeting of users/consumers may occur based on individual apps and/or based on the "channel" type of the app. Although these represent the four most common "channel" types to which app producers may deploy apps, it is recognized that there are and will be alternative ways to share apps with users/consumers in addition to those recited above.

Consumers/users who are targeted for and by apps, and who may also be targeted using classically defined media channels such as those on cable and/or TV, for example, demand that apps work very well and have a great user experience across the multitude of different mobile phones, tablet devices, and desktop computers and wherever they are deployed to or accessed from. It is currently very expensive and time consuming for even the most sophisticated app producers to design, develop, deploy, measure, and maintain one or more Apps that need to be deployed across multiple app "channels" and that work well across multiple devices/OS's. And it is likely that app producers have to design and develop multiple apps that are tailored for each channel to engage app consumers that are being targeted, such as across multiple channel types and/or devices. Once apps are live it is even more difficult for app producers to keep their inventory of apps updated and properly configured. Thus, as time passes, some apps typically fail to work completely or may no longer work properly for consumers/users. Even highly sophisticated app producers discover that keeping apps up to date across multiple device and channel types is resource intensive and costly. There is also currently no unified dashboard whereby app producers can retrieve comparative cross-channel analytics on their Apps that are deployed across a disparate set of devices and/or channels. These problems are even more onerous for app producers that require multiple apps targeted at multiple sets of consumers across devices and channels simultaneously. The aforementioned problems are virtually insurmountable for unsophisticated app producers, as they don't have the resources to build multiple Apps that enable them to reach consumers across multiple devices and channels. These same issues present a serious problem not only for app producers, but also for those who want to sell programs, target advertisements, and provide ongoing Apps support to an almost hopelessly disparate, non-homogenous, diverse set of consumers using countless devices across a variety of channels both on and off the Internet.

Thus, the disclosure provides a media engagement gateway (hereinafter referred to as "MEG"). MEG is an engine, method, and system of engagement that enables both unsophisticated and sophisticated app producers to configure, deploy, and in real-time record the results of a multitude of apps provided to app consumers across devices and channels. MEG may include an app store where app producers access pre-built apps (also collectively hereinafter referred to as "MEG Apps"), and an administrative interface where app producers customize, deploy, measure, and manage their app inventory across devices and channels. In an exemplary embodiment, MEG Apps appear on targeted devices through a launcher and container that enables the deployment of multiple apps on top of one page as a floating layer that works across devices and channels. In embodiments, the container may provide a user-facing front-end, which may be or include the launcher.

A MEG app launcher (i.e., the container front-end) may be dragged and moved anywhere on the page of target ed devices and channels. The MEG app launcher may pass contextual information to deploy MEG Apps in an automated and synchronized fashion based on a variety of sequenced information and triggers transmitted or passed to MEG by devices, consumers, and/or channels. While the aforementioned MEG launcher and MEG app container are shown as one exemplary embodiment for the deployment of MEG Apps, it should be noted that there are other types of MEG app containers that may enable app producers to deploy MEG Apps in a variety of ways other than the one just recited.

MEG may also provide the ability to build custom MEG Apps and containers through the use of a "software developer kit" ("SDK"). Such an SDK may support the development and addition of custom MEG Apps into an app store and custom containers into a MEG manager. Thus is provided a "one-stop-shop" that empowers app producers to quickly and easily control the flow of content and information, promotional offers, and the lines of communication with their consumers across devices and channels. MEG Apps may thereby also deliver a customizable set of user experiences to consumers across devices and channels.

In an exemplary embodiment, a Grocery store merchant decides to utilize MEG to convey important real-time updates and to run a diverse set of promotions and coupons which were formerly only available through the Grocery Store's in-store circular and via the local Newspaper. The merchant, who is an unsophisticated app producer, may use a few pre-built MEG Apps that are all customized and deployed in less than 10 minutes to consumers across devices and channels. For instance, the merchant may choose a "Targeted Notification" MEG App to share real-time inventory updates to target consumers by configuring the MEG App and setting its rules within the MEG manager for the MEG App to deploy automatically across a select number of their devices and channels—in this case, a business website, social network pages, and iOS and Android native apps. The merchant may also choose, as a second pre-built "Timed Special" MEG App, to run a one hour special on strawberries, setting the MEG App's rules to have this MEG App only deployed to targeted consumers that are in the store during the one hour time period during which the special is live. The merchant may then choose as a third "HTML" MEG App to instantly publish a list of all the different coupons that are available this week across all of its targeted devices and targeted channels for only that week. The merchant may then choose as a fourth "In-Store Targeted Notification" MEG App to alert a consumer, depending on the consumer's location within the merchant's store, that the new dairy department is now open. The merchant may then choose a fifth "In-Store Offer" MEG App that publishes a very detailed coupon with a unique authorization code to the consumer for a Toothpaste product when the consumer is standing in the Toothpaste aisle. The merchant may also select to point target consumers to any number of pages on their devices and channels—in this case, a business website, social network pages, and iOS and Android apps—by using one or more instances of the "Contextual Link" MEG App to provide an automated navigation method for consumers enabling automated deployment and surfacing of content—the highest value pages, products, or other relevant business information—to target consumers at exactly the right time in the right manner to increase conversion rates for the business. In this instance, the merchant has set MEG up to automatically surface the item that is most relevant to the target consumer based on her shopping history, her location, and her behaviors at the time that she is on a specific page or in-store.

In short, MEG enables the merchant to customize and deploy all of the aforementioned MEG Apps in under 10 minutes. As such, MEG is easy to use and flexible. The foregoing exemplary embodiment is an illustration of how MEG can create a novel and much improved experience for both app producers and consumers. MEG provides a way to coordinate and deploy information across all the important target devices and channels used by consumers—not just to phones, or to desktop PCs, but all. With MEG Apps, more content and information may be published where it is useful, and less, different or no information may be published where is it not useful to a consumer.

MEG may also provide app producers with additional assurance that MEG Apps function on all target devices and all channels because MEG may handle the ongoing maintenance function. A simple example is, when mobile devices get a new "software update," MEG Apps may get updated without each app producer having to solve this separately.

MEG may also provide a way for app producers to collect comparative cross-device and cross-channel statistics and feedback based upon actual retrieved data from the consumer in real time. This may form the foundation for a successful ongoing sales and marketing strategy.

MEG may provide a way for app producers of almost any size to manage communication with consumers in one easy to use destination. This is, in part, because MEG enables unsophisticated app producers to, in under 10 minutes and with minimal effort, configure, deploy, and in real-time make changes and measure an almost infinitely customizable set of MEG Apps that work across target devices and channels.

MEG may also be the enabler, accelerant, time, resource, and money saver for sophisticated app producers that currently have to laboriously build, deploy, manage, and measure an extensive inventory of apps that aim to effectively engage consumers across all of their target channels and devices. MEG may thus simplify multichannel mobile engagement. MEG enables sophisticated app producers to create and deliver a variety of multichannel experiences in an automated and/or sequenced manner by integrating their systems and APIs with MEG. MEG, a MEG manager, MEG Apps, a MEG launcher, and containers may pass contextual information to deploy MEG Apps in an automated and synchronized fashion based on a variety of sequenced information and triggers transmitted or passed to and by and between MEG and the sophisticated app producers, and target devices, Target App Consumers, and/or Target App Channels The foregoing MEG apparatus, system and method may be particularly implemented, by way of non-limiting example, by way of the exemplary aspects and embodiments illustrated in the figures and description herein. FIG. 1 depicts an exemplary computing system 100 for use in accordance with herein described system and methods. Computing system 100 is capable of executing software, such as an operating system (OS) and a variety of computing applications 190. The operation of exemplary computing system 100 is controlled primarily by computer readable instructions, such as instructions stored in a computer readable storage medium, such as hard disk drive (HDD) 115, optical disk (not shown) such as a CD or DVD, solid state drive (not shown) such as a USB "thumb drive," or the like. Such instructions may be executed within central processing unit (CPU) 110 to cause computing system 100 to perform operations. In many known computer servers, workstations, personal computers, and the like, CPU 110 is implemented in an integrated circuit called a processor.

It is appreciated that, although exemplary computing system 100 is shown to comprise a single CPU 110, such description is merely illustrative as computing system 100 may comprise a plurality of CPUs 110. Additionally, computing system 100 may exploit the resources of remote CPUs (not shown), for example, through communications network 170 or some other data communications means.

In operation, CPU 110 fetches, decodes, and executes instructions from a computer readable storage medium such as HDD 115. Such instructions can be included in software such as an operating system (OS), executable programs, and the like. Information, such as computer instructions and other computer readable data, is transferred between components of computing system 100 via the system's main data-transfer path. The main data-transfer path may use a system bus architecture 105, although other computer architectures (not shown) can be used, such as architectures using serializers and deserializers and crossbar switches to communicate data between devices over serial communication paths. System bus 105 can include data lines for sending data, address lines for sending addresses, and control lines for sending interrupts and for operating the system bus. Some busses provide bus arbitration that regulates access to the bus by extension cards, controllers, and CPU 110. Devices that attach to the busses and arbitrate access to the bus are called bus masters. Bus master support also allows multiprocessor configurations of the busses to be created by the addition of bus master adapters containing processors and support chips.

Memory devices coupled to system bus 105 can include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process' virtual address space unless memory sharing between the processes has been set up.

In addition, computing system 100 may contain peripheral controller 135 responsible for communicating instructions using a peripheral bus from CPU 110 to peripherals, such as printer 140, keyboard 145, and mouse 150. An example of a peripheral bus is the Peripheral Component Interconnect (PCI) bus.

Display 160, which is controlled by display controller 155, can be used to display visual output and/or presentation generated by or at the request of computing system 100. Such visual output may include text, graphics, animated graphics, and/or video, for example. Display 160 may be implemented with a CRT-based video display, an LCD-based flat-panel display, gas plasma-based flat-panel display, touch-panel, or the like. Display controller 155 includes electronic components required to generate a video signal that is sent to display 160.

Further, computing system 100 may contain network adapter 165 which may be used to couple computing system 100 to an external communication network 170, which may include or provide access to the Internet. Communications network 170 may provide user access for computing system 100 with means of communicating and transferring software and information electronically. Additionally, communications network 170 may provide for distributed processing, which involves several computers and the sharing of workloads or cooperative efforts in performing a task. It is appreciated that the network connections shown are exemplary and other means of establishing communications links between computing system 100 and remote users may be used.

It is appreciated that exemplary computing system 100 is merely illustrative of a computing environment in which the herein described systems and methods may operate and does not limit the implementation of the herein described systems and methods in computing environments having differing components and configurations, as the inventive concepts described herein may be implemented in various computing environments using various components and configurations.

Figure 2:
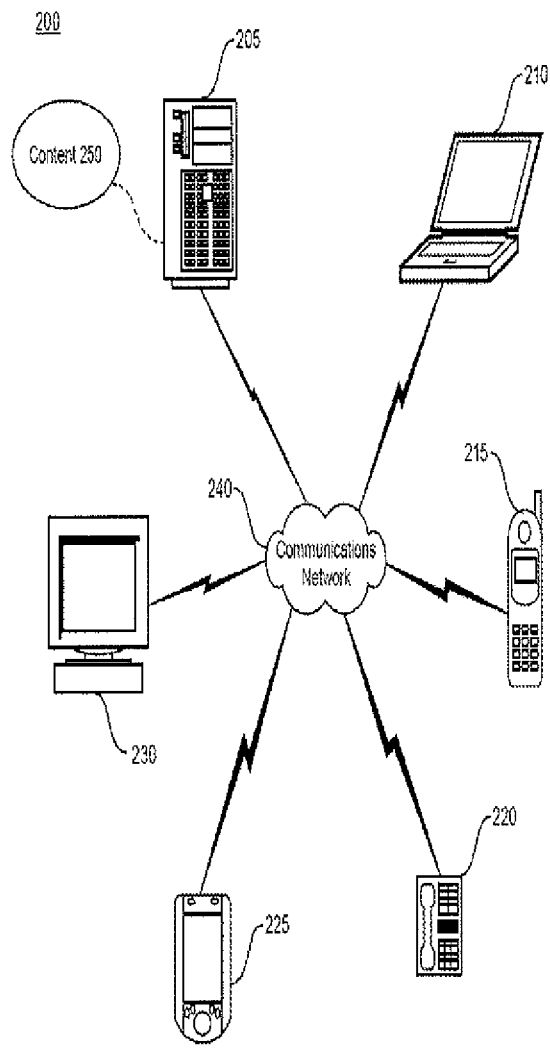
FIG. 2 illustrates an aspect of an exemplary embodiment of the present invention.

As shown in FIG. 2, computing system 100 can be deployed in networked computing environment 200. In general, the above description for computing system 100 applies to server, client, and peer computers deployed in a networked environment, for example, server 205, laptop computer 210, and desktop computer 230. FIG. 2 illustrates an exemplary illustrative networked computing environment 200, with a server in communication with client computing and/or communicating devices via a communications network, in which the herein described apparatus and methods may be employed.

As shown in FIG. 2, server 205 may be interconnected via a communications network 240 (which may include any of, or any combination of, a fixed-wire or wireless LAN, WAN, intranet, extranet, peer-to-peer network, virtual private network, the Internet, or other communications network such as POTS, ISDN, VoIP, PSTN, etc.) with a number of client computing/communication devices such as laptop computer 210, wireless mobile telephone 215, wired telephone 220, personal digital assistant 225, user desktop computer 230, and/or other communication enabled devices (not shown). Server 205 can comprise dedicated servers operable to process and communicate data such as digital content 250 to and from client devices 210, 215, 220, 225, 230, etc. using any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), virtual private network (VPN) security, or the like. Each client device 210, 215, 220, 225, 230, etc. can be equipped with an operating system operable to support one or more computing and/or communication applications, such as a web browser (not shown), email (not shown), or the like, to interact with server 205.

The present invention provides an engagement platform, i.e., the afore-discussed MEG, which may enable the delivery of out-of-the-box "app"-like experiences and analytics across mobile devices and digital channels. The MEG may be API driven and may include pluggable constructs which may dynamically interact with third party content and/or web sites.

The MEG may be implemented in the computing and networked environment, and across the devices using the one or more processing systems described above with respect to FIGS. 1 and 2. MEG may employ any number of the aforementioned MEG rules indicated by computing code stored in computing memory and executed by one or more computing processors, which rules may be statically employed against a particular variable or dynamically employed based on a particular variable. In short, rules may include any decision-based direction.

Apps, and particularly MEG Apps, utilized within the present invention may be built via a set of services and may be created via an open API, for example, which may also allow third parties access to application build functionality and/or to previously built apps or app templates. These apps may be thereafter managed using a MEG manager, as discussed above. As may be appreciated by those skilled in the art, apps may be related to any number of service and/or goods offering, such as, for example, a simple photo contest, or a more complex customer service experience that may interact with a third party enterprise system. Apps may be available to end users/consumers of the present invention through the aforementioned app store, or via direct download, for example.

MEG may further enable non-technical end users of a platform to configure and deploy MEG apps, such as in a range of a matter of minutes, through a particular administrative control panel integrated with the MEG manager. Apps may be deployed to the mobile web, and/or in pages thereof, and into, for example, the channels discussed above, via the containers and through the explicit MEG rules. Applications, as well as the rules to which apps are subject and containers in which apps reside, may be deployed to a website via a line or lines of JavaScript, or via an API call to another platform or system, or through a direct link that can be posted into any social network or other digital channel. Accordingly, apps may "spring", such as via the aforementioned launcher, and may be updated in real time once they are live, such as using the MEG manager.

In some embodiments, the present invention comprises one or more of the afore-discussed containers that may be capable of storing information which may be used and accessed by a user. In some embodiments, the information may be in the form of an app which may be launched via the launcher, or may be a file which includes information about an item offered for sale by a third party commerce provider, for example. In other embodiments, a file within a container may include records that have various attributes capable of being actionable or linked to external content (such as content residing on a third party system). Each container may be capable not only of interfacing with third party websites, but may contain logic that enables the container to perform certain actions with respect to the files contained in the container.

Further, each file may include logic associated therewith that enables actions to be performed with respect to the item represented by the file. In an embodiment of the present invention, MEG may comprise shopping cart functions enabling a user to continue to transact electronic commerce with respect to a third party offering, for example, and may allow for the use of user specific payment details without direct interaction with the third party site shopping cart functionality by the user. In this way, MEG may be used to simplify the information exchange necessary in ecommerce transactions and may allow for tighter control by the user over sensitive financial-based information.

In certain embodiments, depending on the type of container utilized, different actions may be performed with respect to the items included in the container or with respect to items not yet included in the container. For example, items listed on any website or app may be added to one or more containers through functionality such as drag-and-drop or buttons. When an item is added to a container, logic in the container may cause portions of the container to interface with the website or app on which the item was listed to extract or retrieve data (including metadata) related to the item. This data may be used to populate the information corresponding to the item.

Containers may be the launch pad by which applications are deployed. A container, depending on its form factor, may house multiple applications on one page, and may enable different applications to be deployed by different rules on the same page or on different pages. A container, for example, may provide a flexible user experience that enables the deployment of applications and channel based notifications to end users. A container may act as an overlay onto any channel, regardless of technical specifications with applications being visible to consumers via the container. Depending on deployment rules, for example, different consumers may see different applications visible on the same page. Similarly, at least two channels may be associated together to provide multichannel access on at least one, and preferably, a plurality of devices.

Figure 3:
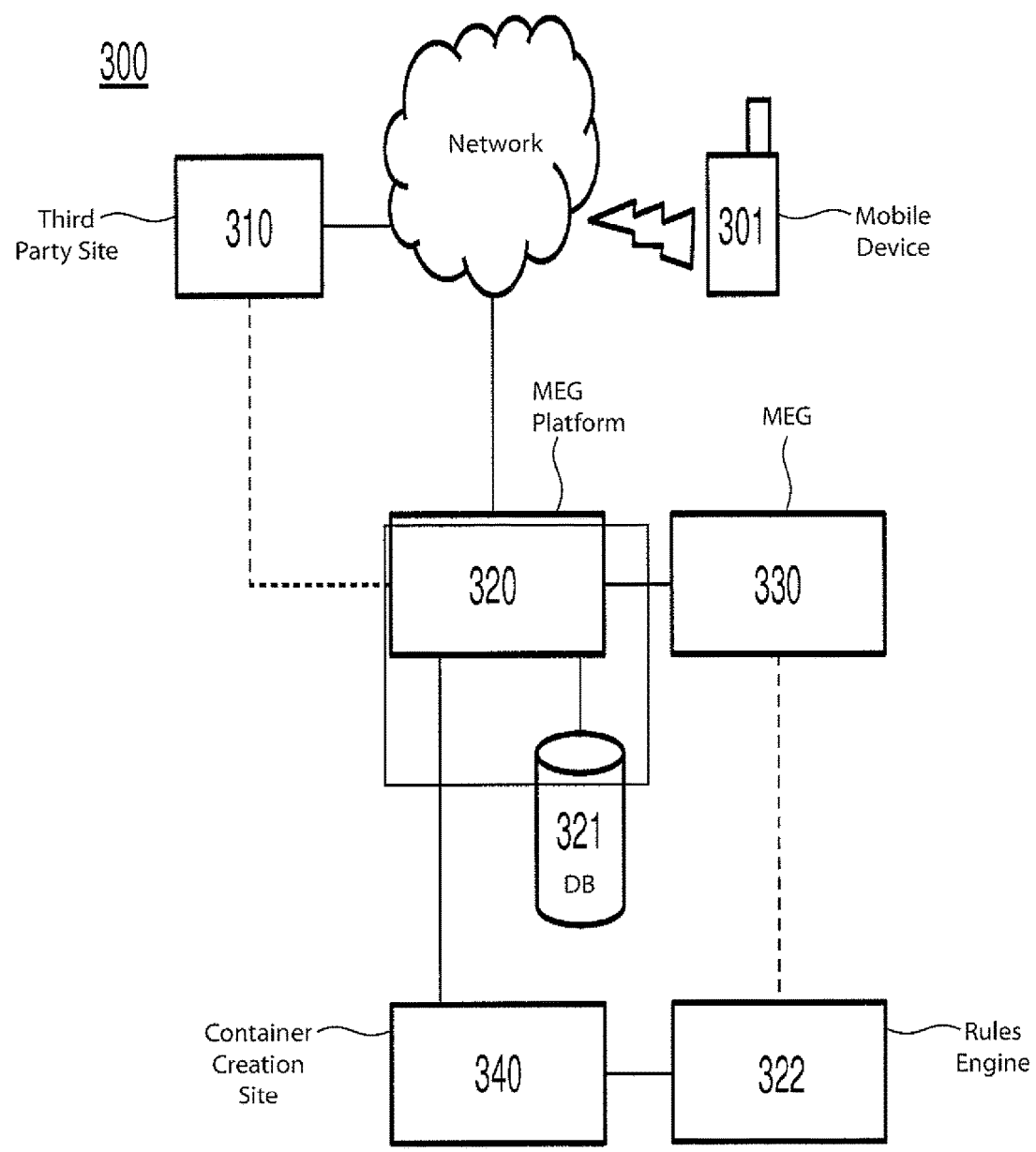
FIG. 3 illustrates an aspect of an exemplary embodiment of the present invention.

As illustrated in FIG. 3, a user having a mobile device 301 may be interconnected with portions of an exemplary MEG ecosystem 300 with access to a MEG platform 320 having at least one MEG 330. As discussed above, the MEG platform 320 may include a database 321 suitable for storing information related to users, for example. Containers may be created through the container creation engine 340 and may be associated with at least one rule from the rules engine 322. Although the MEG platform 320 may be remote from a user, a third party site 310 may be linked or have integral therewith at least one MEG platform 320.

Applications may be deployed via a set of automated rules that may be configured by users of the platform which may be executed by the rules engine 322. Rules may be container based, time based, location based, device based, and/or based on user attributes. Such user attributes may include, for example, demographics, use-based statistics, such as, purchasing history, site visit times, and pages viewed, for example, social interactions between users, and/or site memberships. As would be appreciated by those skilled in the art, any number of logic parameters may be deployed as rules and may be static and/or dynamically related.

By way of non-limiting example only, exemplary rules for an app/container may: 1) deploy the application via a notification 5 seconds after the consumer has opened the webpage; 2) only show app in the container to consumers that are on an iPhone®; 3) only show the app in the container to consumers that have their language set to Spanish; 4) only show the app in the container to consumers that check-in to a Philadelphia store location; 5) only show the app in the container to consumers that are viewing a specific product on one of our channels (website, iOS, Android, Facebook); 6) automatically deploy the application as an overlay on top of our channel as soon as the consumer opens our products page (or other designated page); 7) only show the app during a defined date range; 8) only show the app when an app consumer has walked to the middle of an isle and picked up the toothpaste box within our store; 9) automatically show different apps to consumers that fall within different age ranges based on different behaviors and actions. Similarly, for example, a promotional item may be presented for only a single short period of time to create exclusivity and/or scarcity. For example, an ad for 50% off a particular brand of cosmetics at a beauty counter in a mall store may be presented to a user and/or only redeemable for a short duration of time, such as for less than 5 min, for example.

MEG apps and containers may also have analytics systems associated with them. For example, end uses of the platform may view and export detailed usage metrics for their containers and applications from the platform. In this way, the access to information by a user and the success of offers and the organization of information may be reviewed and optimized to enhance the experience for the user and/or to improve use of the MEG by the user. Referring again to FIG. 3, the MEG platform 320 may collect and store such data in database 321 which may further be available for use by other containers and other third party sites 310. In an embodiment of the present invention, a profile may be established for each user and may record the behavior and attributes of the user and the user's device.

In an embodiment of the present invention, information showing various use activities and metrics may be provided and may be modified and manipulated by a user. Broadly, the information presented may include the tracking of interactions between at least one user and a MEG and/or app, for example. Tracked interactions may include click-throughs, touches, views, and/or other interactions capable of being tracked by a particular device. For example, as would be appreciated by those skilled in the art, various device capabilities, such as eye-tracking/sensing, may be employed with the present invention to provide and/or augment the tracked attributes. The tracked attributes may be filtered by device type, time interval, for example.

Figure 4A:
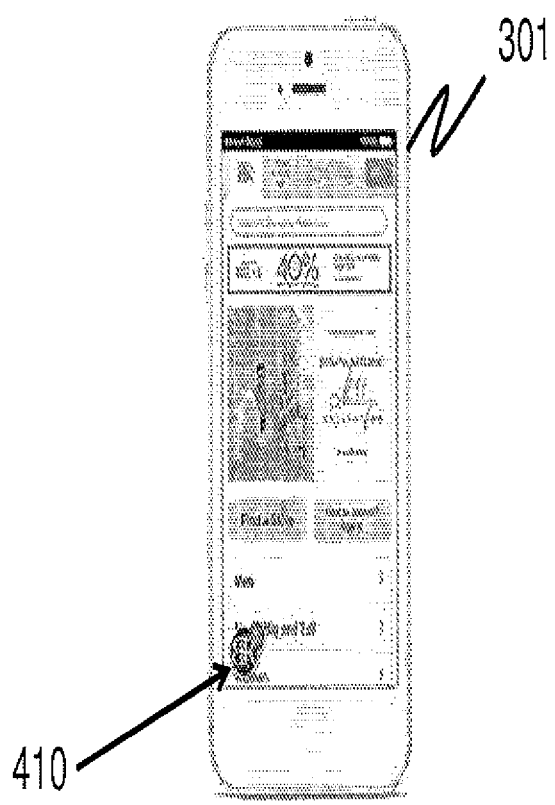
FIGS. 4A-H illustrate aspects of exemplary embodiments of the present invention.
Figure 4B:
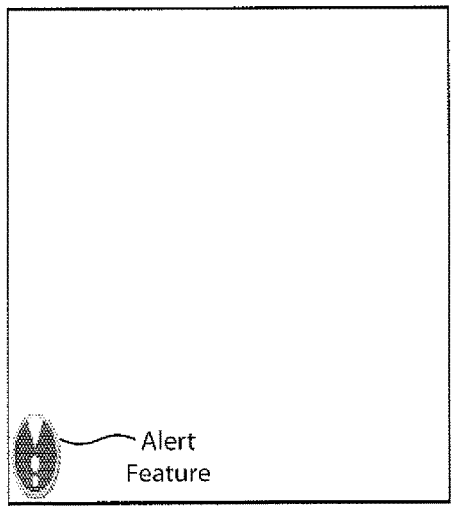
Figure 4C:
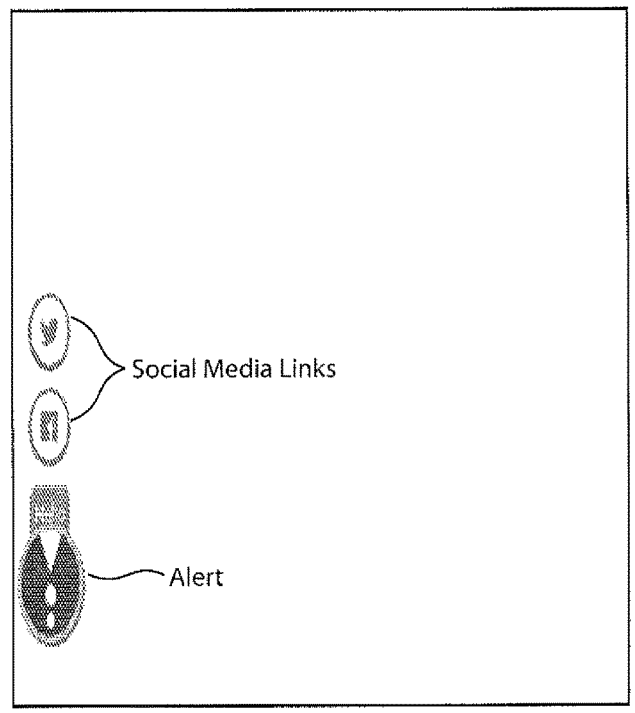

As illustrated in FIG. 4A, a MEG 410 may be deployed on a third party website, such as a clothing retailer, and may be in the form of an icon or launcher and may further include the trademark or other insignia of the third party website owner. In a mobile environment, as illustrated, the MEG icon may be presented in any portion of the viewable window and may be moved by the user to any other viewable location. The MEG icon may also have associated therewith at least one alert feature, such as, as illustrated, an extension of the icon having a notation illustrative of the number of alerts available to the user.

Figures 4D, 4E, 4F:
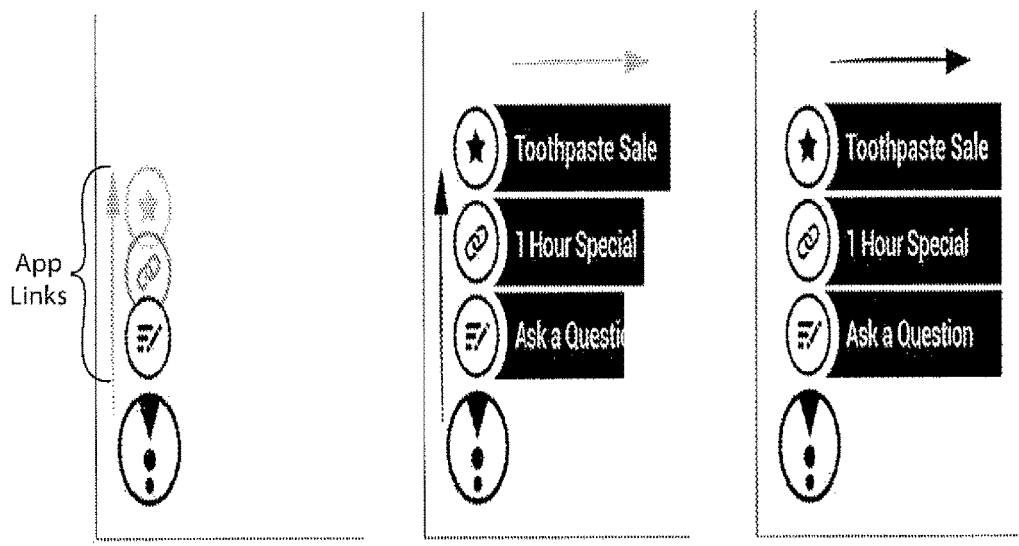
Figure 4G:
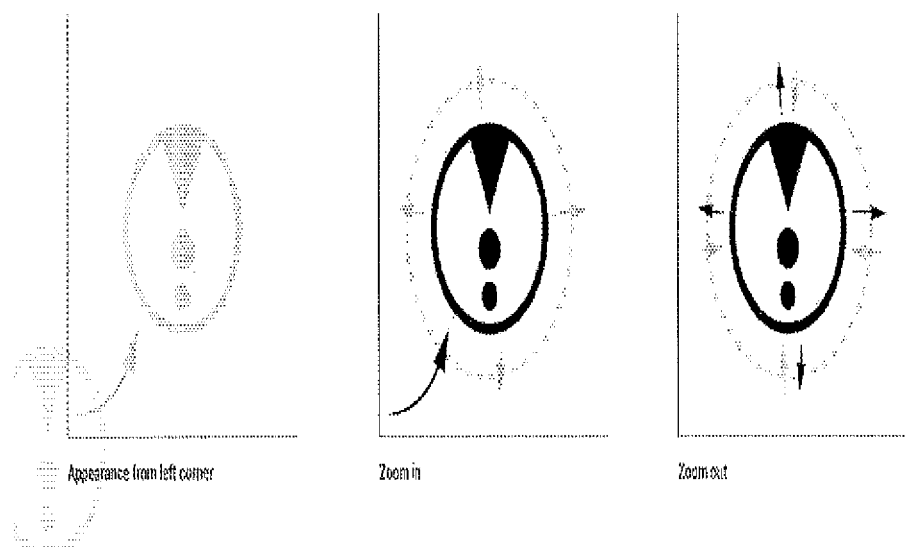
Figure 4H:
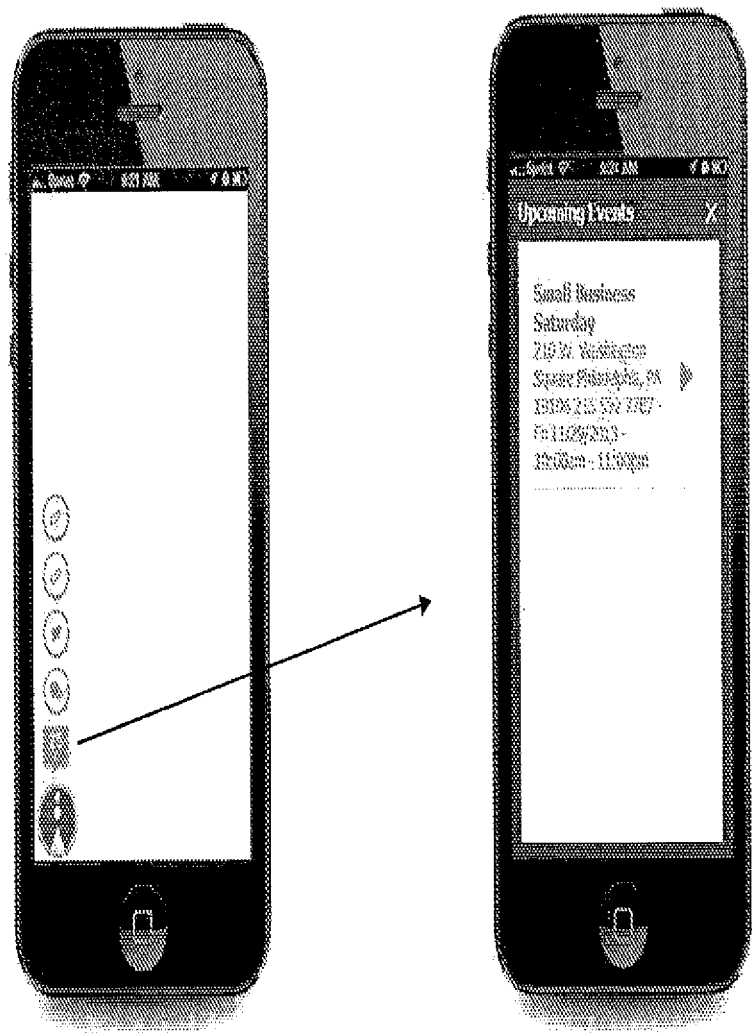
Figure 17:
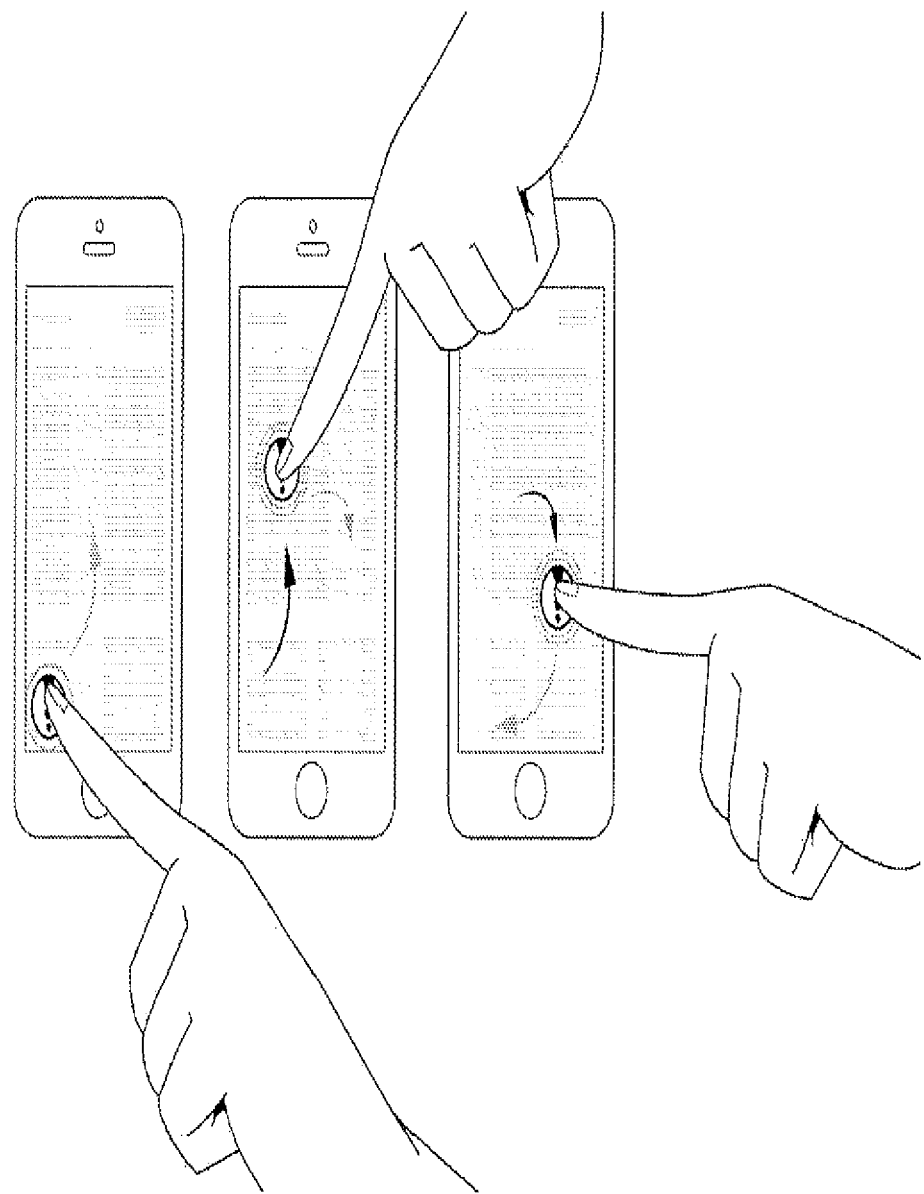
FIG. 17 illustrates an aspect of an exemplary embodiment of the present invention.

Although illustrated as resident in the lower left corner of the presented web site, the MEG 410 in application is an overlay and may be moved anywhere within the viewable space by the user so as to allow for customization of placement and access to the full overlaid site without minimizing the MEG, such as illustrated in FIG. 17, for example. The MEG 410 may include a minimize/shut down functionality and may include such functionality as a scalable and/or selectable menu item as discussed in greater detail herein below and as illustrated in FIG. 4G, for example.

Figure 5A:
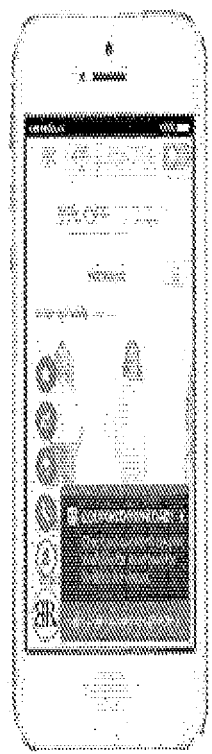
FIGS. 5A-B illustrate aspects of exemplary embodiments of the present invention.
Figure 5B:
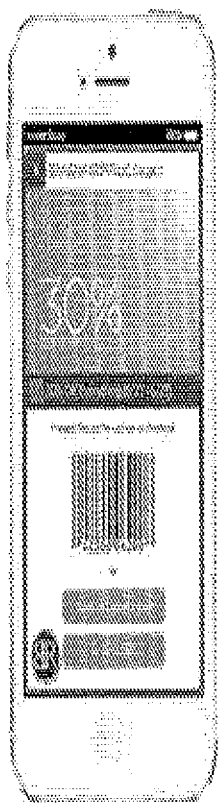

For example, as further illustrated in FIG. 4A, the MEG 410 may also include an "alert" feature which may present itself as, for example, a visually different portion indicative of at least one new and/or additional piece of information associated with the MEG 410. Activation of the alert associated with the MEG icon may present the user with the information associated with the alert which may, for example, comprise information surrounding a coupon associated with the third party website. Such information may lead the user to the actual coupon, as illustrated in FIG. 5A, which may be delivered via a subset of rules as discussed herein. In this exemplary embodiment, the coupon may be delivered to the user based on the number of site visits to the particular clothing retailer site and may have the value of the coupon based on the type of device used to access the site. For example, and as illustrated in FIG. 5B, a user of an iPhone may be presented a coupon worth thirty (30%) percent off, while a DOS-based desktop user may be presented a coupon worth ten (10%) percent off.

Referring now again to FIGS. 4B-4H, a published container may contain any number of apps and/or menu/link items. In addition to apps and social network links, a container may also contain code allowing for such things as calendar invites and the like. Once selected and launched, as illustrated in FIG. 4D, a meeting invite may be viewed and/or added to a user's device through a compatible app. This exemplary use of the present invention demonstrates the flexibility in design and information dissemination possible through the use of such containers.

Similarly, aspects of the coupon may be dynamically changed, such as the value of the coupon, the type of coupon offered, the redeemable locations, and/or the expiration of the coupon, for example, which may allow for periodic and/or user-based optimization of the offered coupon. For example, the location of the user when offered and/or accessing the coupon may trigger a location-based rule wherein the coupon is redeemable only in a store closest to the user for which the target goods/services may be purchased. In such an embodiment, the location of the user may be obtained by traditional GPS methods, the use of local WiFi triangulation, and/or through location identifiers, such as the use of NFC tag technology, for example. Similarly, the demand for a certain product/service may alter the coupon tendered.

Figure 6A:
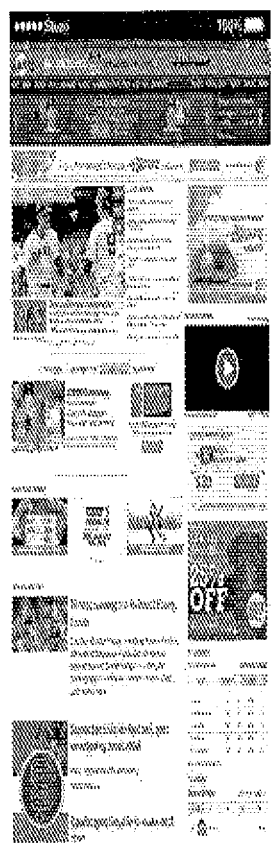
FIGS. 6A-K illustrate aspects of exemplary embodiments of the present invention.
Figure 6B:
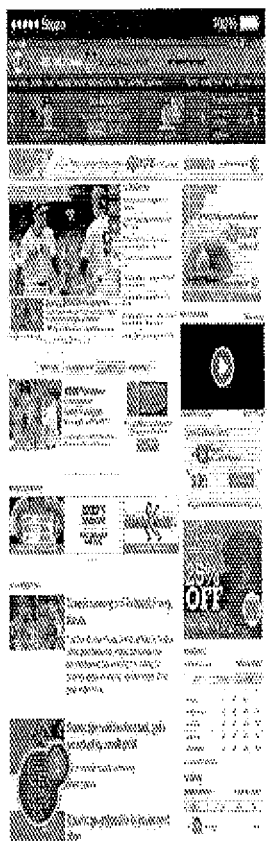
Figure 6C:
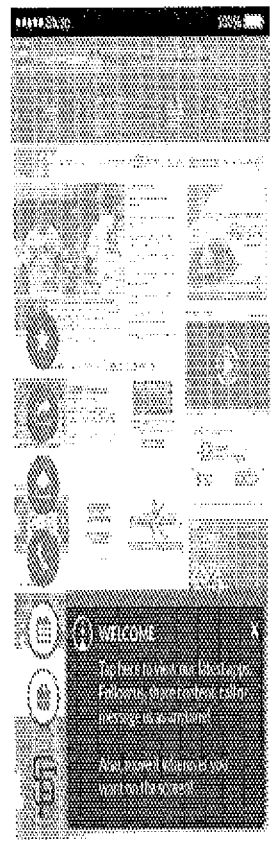

The use of a MEG may also perform and/or augment the channel in which it may be associated and may provide more efficient access to certain features either desired by the user and/or desired by the web site operator to be given greater prominence. As illustrated FIGS. 6A-F, a sports team may utilize a MEG to highlight various ancillary portions of information and offerings related to the team. As illustrated in FIG. 6B, and as discussed above, an alert may be provided with the MEG to bring to the user's attention the location of the MEG and/or that new and/or additional information is associated with the MEG, for example. Similarly, interaction with the MEG may provide at least one information message, as illustrated in FIG. 6C, which may, for example, provide a new user with instruction on how to interact with the MEG, provide real-time information related to the content of the apps associated with the MEG, and/or provide an additional interaction for the collection of information and/ or for additional functionality.

Figure 6D:
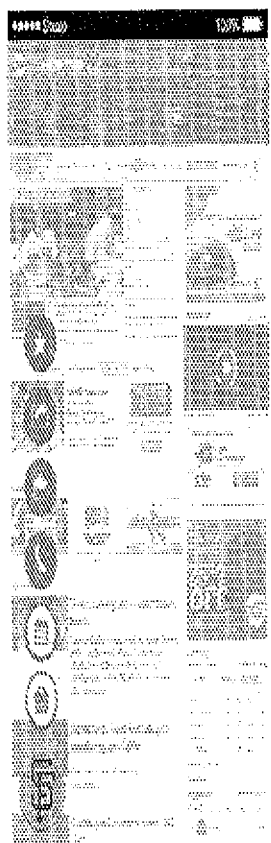
Figure 6E:
Figure 6F:
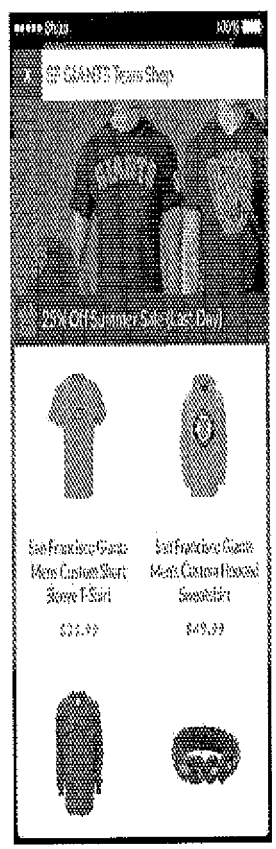
Figure 6G:
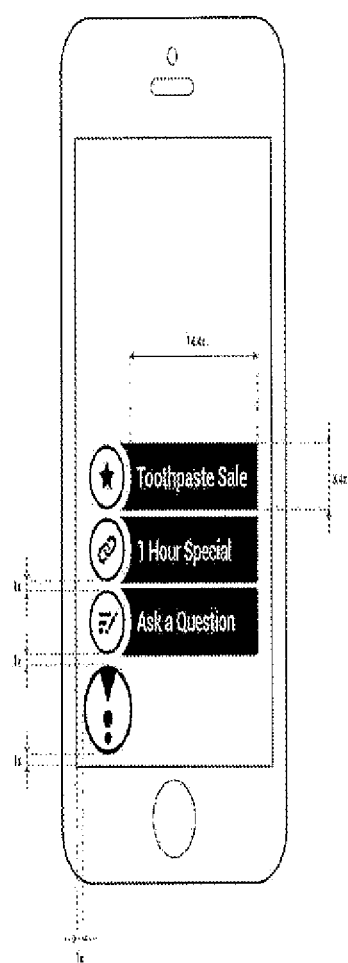
Figure 6H:
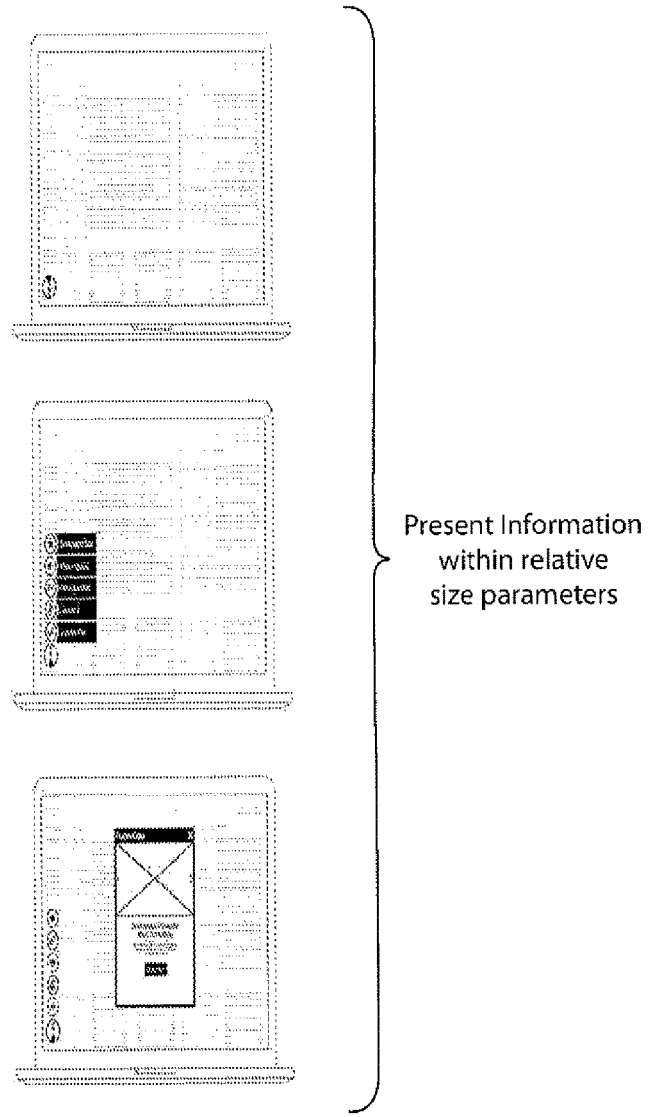
Figure 6I:
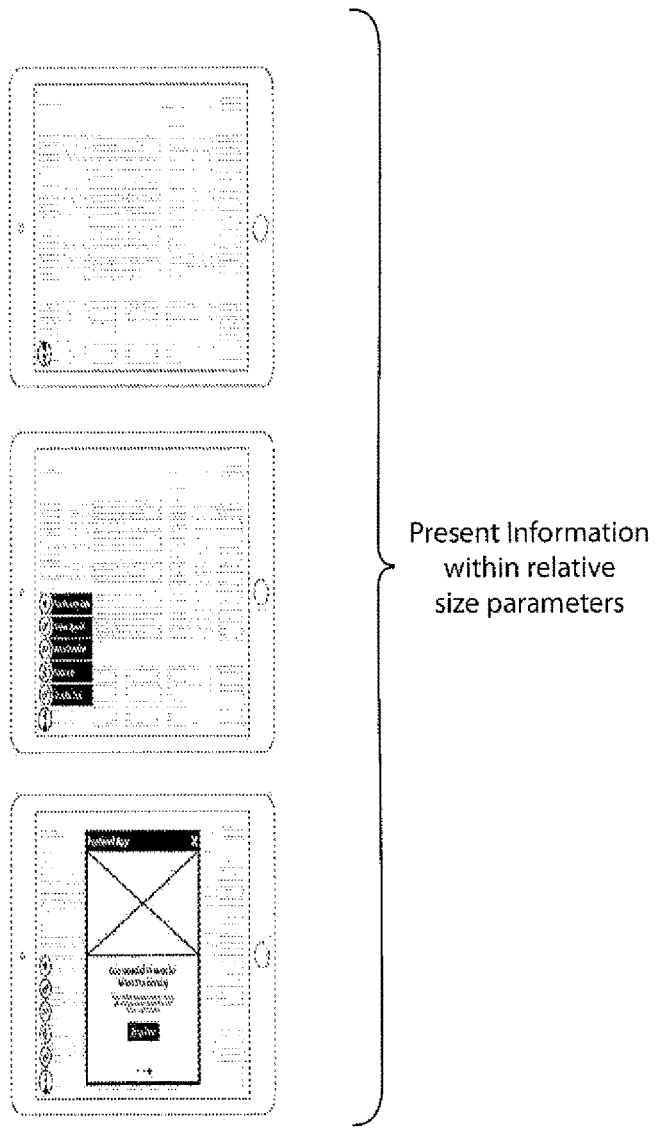
Figure 6J:
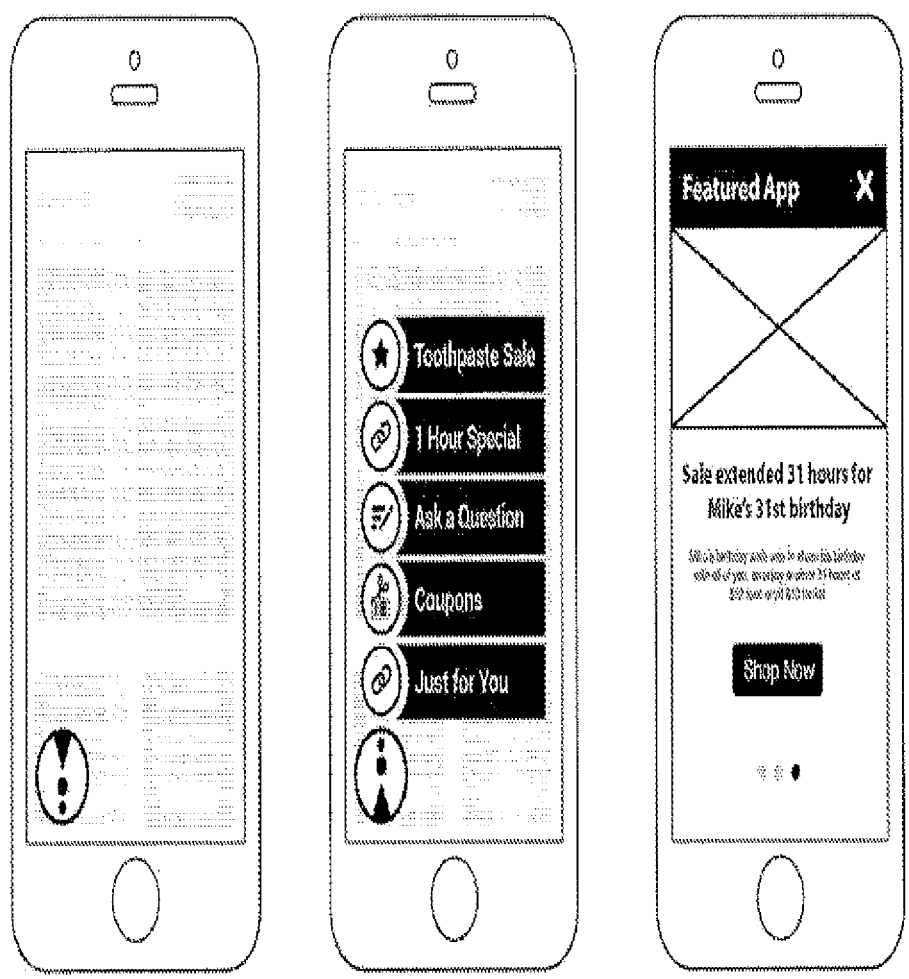
Figure 6K:
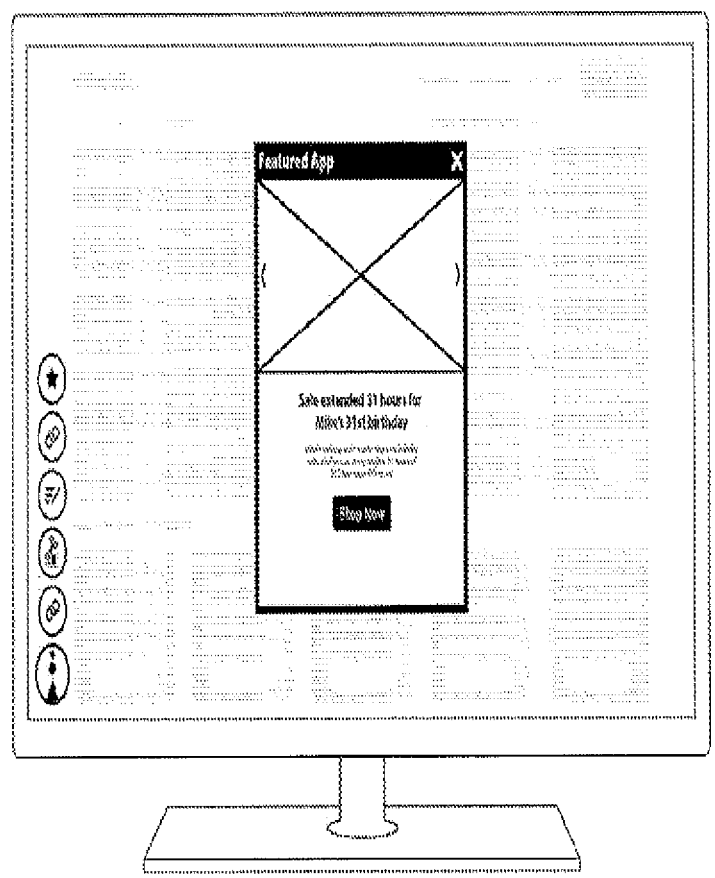

As illustrated in FIG. 6D, interaction with the MEG may provide a menu to allow for the selection of information and/or other In an embodiment of the present invention, as illustrated in FIG. 6E, when selected by the user, the MEG may provide a menu of additional features, which in this example may allow the user to "follow" the team over various social media accounts with a single selection within the MEG provided menu, share the website and/or MEG with a third party, communicate with the team, review the team's schedule, and/or engage the team's commerce site, for example. Clicking on or otherwise selecting a particular menu item (or the MEG icon itself) may present the user with a full view of additional information as illustrated in FIGS. 6F and 6J, for example. Such a presentation of information and/or interaction may be provided as an overlay or, for example, a new window. The MEG may also present information within the relative size parameters offered by the device which it is resident, such as illustrated in FIGS. 6G-6I.

As illustrated in FIGS. 6A-F, the selection by the user to visit the above described team's commerce site through selection of a MEG menu item may bring a user to a customized page within the commerce site. For example, in accordance with various user attributes, a particular discount and/or item(s) may be offered to the user to increase the potential for the purchase of a good/service by the user. Such user attributes may comprise, for example, the number of visits the user has made to the team's site, past purchase history from the team and/or other sports related purchases (to the extent such information is available for collection by the present invention), and/or the previous viewing activity conducted by the user in relation to the team's commerce site.

As discussed herein, the dynamic or intelligent delivery of content by the present invention may be initiated across single or multiple levels and may be responsive to multiples of user attributes, site characteristics, and/or administratively defined parameters. For example, an administrator of a MEG container, for example, may associate at least one app and further associate at least one deployment rule to control the use of the container. By way of further example, the MEG container may contain two apps, one tailored towards an English speaking audience and one tailored towards a Spanish speaking audience. A deployment rule may launch either app based on user or device information related to whether the user is more likely to speak English or Spanish. For example, the MEG may access the phone settings where Spanish may be chosen by the user as the preferred language. Similarly, the deployment rule may prompt the user to input which language is preferred.

In an embodiment of the present invention, deployment rules may also be used to prompt events based on user activity and may track user interactions with a particular web site and/or through all interactions with a browser once the MEG is launched and/or is active. For example, if a user is viewing a site such as a automobile manufacturer for a defined period of time (such as 5 minutes) or over a defined number of pages within the site (such as three), an intelligent rule may launch an app providing to the user information related to the purchase of the viewed automobiles, such as, for example, the location of the closest dealership and/or offers for sale and/or coupons associated with the viewed product.

Figure 7A:
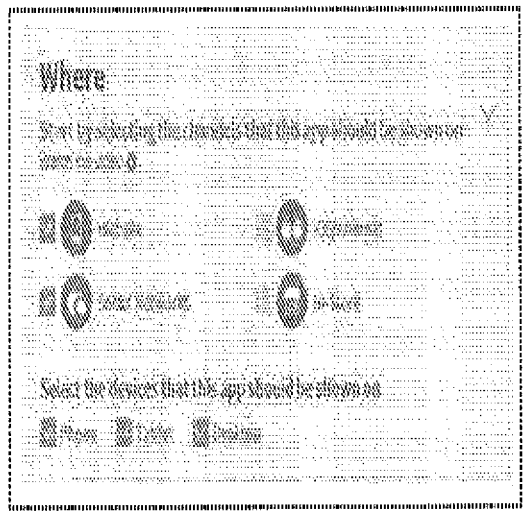
FIGS. 7A-C illustrate aspects of exemplary embodiments of the present invention.
Figure 7B:
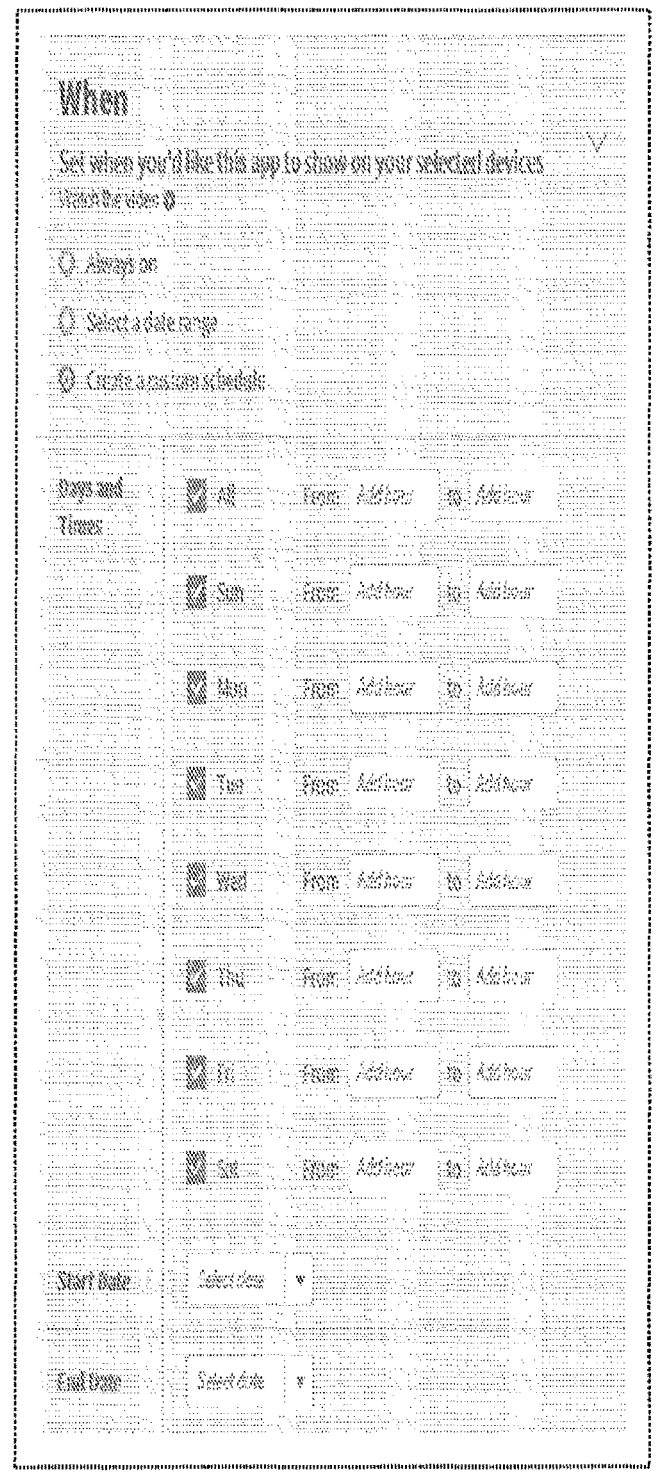
Figure 7C:

In an embodiment of the present invention, and as illustrated in FIGS. 7A-C, a user interface may be provided to allow a user to select a set of rules to be implemented, where those rules should be applied, and how those rules should be carried out. As illustrated in FIG. 7A, a user may define the channels for distribution which may comprise, for example, a website, at least one social network, a specific operating system, and location-based sites. A user may also select when an app or channel may be presented or active, such as using rules illustrated in FIG. 7B. An app may be always active, active over a specific date and/or time range, and a combination thereof, for example. Finally, the providing of the app may be dictated by a user and, as discussed above, an app may or may not be launched automatically, and/or may be brought to the attention of a user through an alert and/or notification. As illustrated in FIG. 7C, for example, the app may be selected to be included and/or excluded from specific websites/pages/URLs, may be shared on social media, included in s business app (discussed in more detail herein), and/or launched via location-based services and/or a beacon, for example.

A beacon deployment consists of one or more beacon devices that transmit their own unique identification number to a local area. Software on a receiving device may then look up the beacon and perform various functions, such as notifying the user of a MEG app, for example. Receiving devices may also connect to a beacon to retrieve values from a beacon's GATT (generic attribute profile) service. A beacon's region of monitoring may be limited to 20 regions and may function in the background (of the listening device)

and may have various delegates to notify at least one listening app (and user) of entry/exit in the region—even if app is in the background or phone is locked.

As would be appreciated by those skilled in the art, the distance between a transmitting beacon and at least one receiving device may be categorized into three distinct ranges: immediate (within a few centimeters); near (within a couple of meters); and far (greater than 10 meters away). The maximum range of a beacon transmission may depend on the location and placement, obstructions in the environment and where the device is being stored. Standard beacons have an approximate range of 70 meters while long range beacons may reach up to 450 meters. Absent a beacon, the present invention may provide a QR code, for example, for physical display by a user, such as, for example, a merchant.

Figure 8:
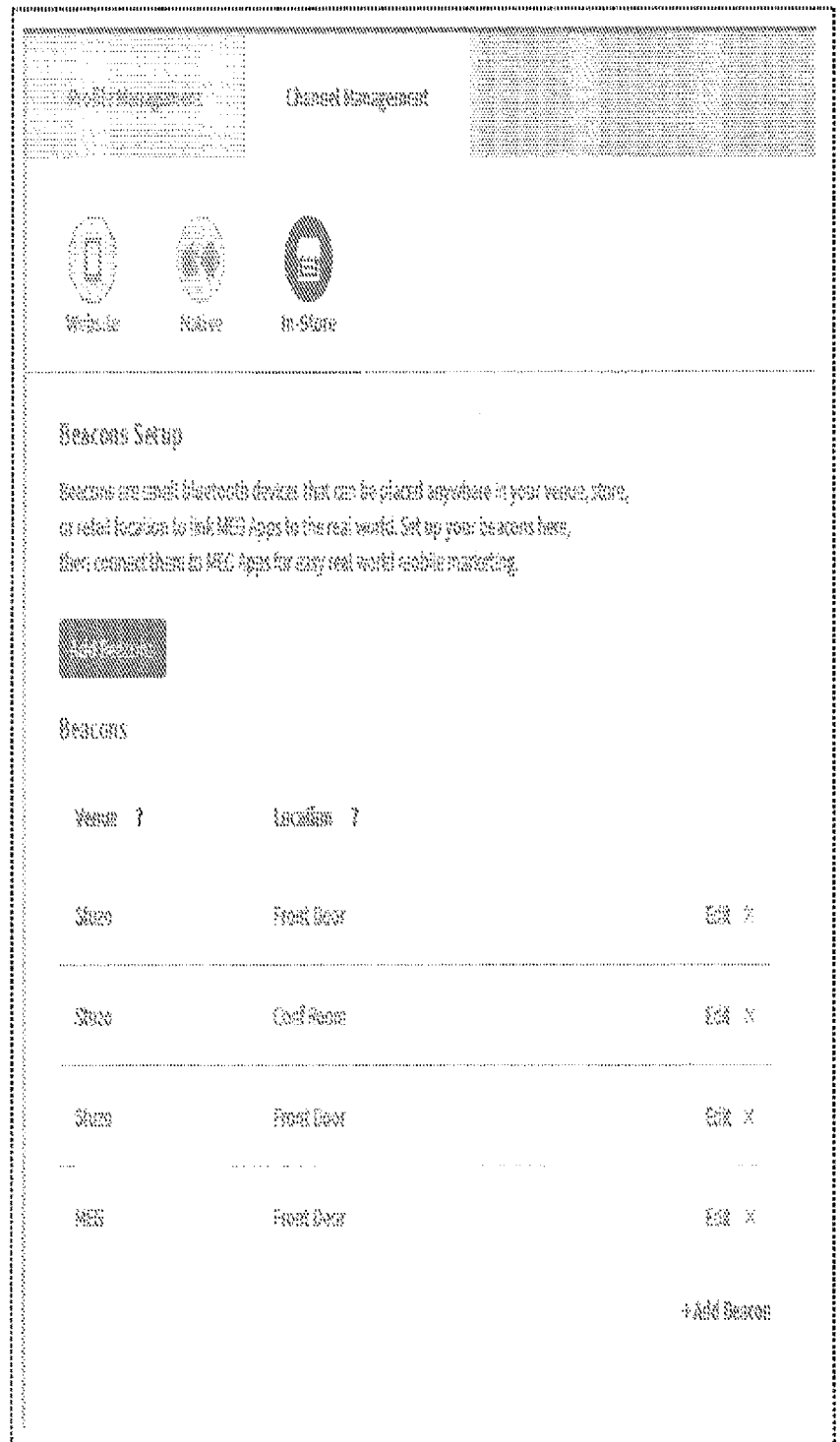
FIG. 8 illustrates an aspect of an exemplary embodiment of the present invention.

In an embodiment of the present invention, as illustrated in FIG. 8, the present invention may provide for the set-up and control over beacons for which an app is authorized to interface. For example, a user may wish to deliver an alert to a sale within a store to potential customers passing by on the street/sidewalk outside of the store—but not otherwise disturb them once inside. Similarly, beacons may be configured to deliver to a customer a coupon when the potential customer is in a particular isle of a store and/or is near to a particular product for which a beacon and/or other local device, such as an NFC tag, for example, is resident.

Similarly, apps and/or information may be delivered and/or made available to a user based on prior viewing by the user. Continuing with the prior example, if the same user next visited a classified ads site, an ad may be delivered referring to the sale of used automobiles, for example. Similarly, the classified ads site may use the prior visitation information to filter and present to the user classified ads related to the sale of automobiles. Such rules may also work in related to social networks, such as Facebook for example, where an app may be launched if the user was directed to the site through a Facebook link.

Deployment rules may also control the content available through a MEG based on the per page views within a particular website. In this way, the apps and/or menu selection may be further modified in accordance with the position of the user within the website. For example, the user may have navigated to the commerce page of a particular website and may no longer need access information delivered through the MEG. A more efficient delivery of information may include changing the presented menu through the MEG to include non-duplicative information and/or additional details regarding the purchase of a particular good and/or information related to the availability of a coupon, for example.

In an embodiment of the present invention, the use of a MEG within a mobile environment wherein the user is located in close proximity to a high number of merchants, such as in a mall environment, may provide the user with information regarding specific buying opportunities and may provide at least one purveyor of goods information about the user. In an embodiment of the present invention, a MEG may be associated with a web site or an iOS or Android app dedicated to the mall and may provide information about the stores and provide access to the apps associated with the various stores. Similarly, in the same fashion as discussed above, promotions may be launched and/or brought to the user's attention through an alert, such as through a beacon, as discussed above.

In an embodiment of the present invention, a local store may launch a MEG App on the user's mobile device once the user is within or proximate to the retailer's store. As discussed above, GPS and other location services may identify mobile device in sufficient proximity to push to the device at least one MEG App. Similarly, a user may be on the website/mobile site of the store retailer and may have a MEG App and/or an alert launched when entering the store to inform the user of special and available merchandise and services. In an embodiment of the present invention, the location/identification of a mobile device within a store may be obtained through local WiFi/Bluetooth provided by the store (each allowing for a controlled range of reception) and/or through the use of RF devices placed throughout the store, such as NFC tags, for example. In this way, passive and/or active tags may be accessed and may, for example, point the browser of a user device to the store's website and/or designated container.

Such a locally delivered MEG may allow the store to receive real-time shopper analytics while providing for the delivery of information and/or instant coupons to the user's device. For example, a user who enters the store and is pinged by an active NFC tag to accept a local MEG may be provided a customized coupon based on the location of the user within the store to optimize the purchasing opportunity. Thus, for example, the identification of a user in women's shoes may prompt the launch of at least one ad/coupon for a specific type of boot—with such coupon being available for redemption for a defined period of time and/or until the user leaves the store.

Figure 9:
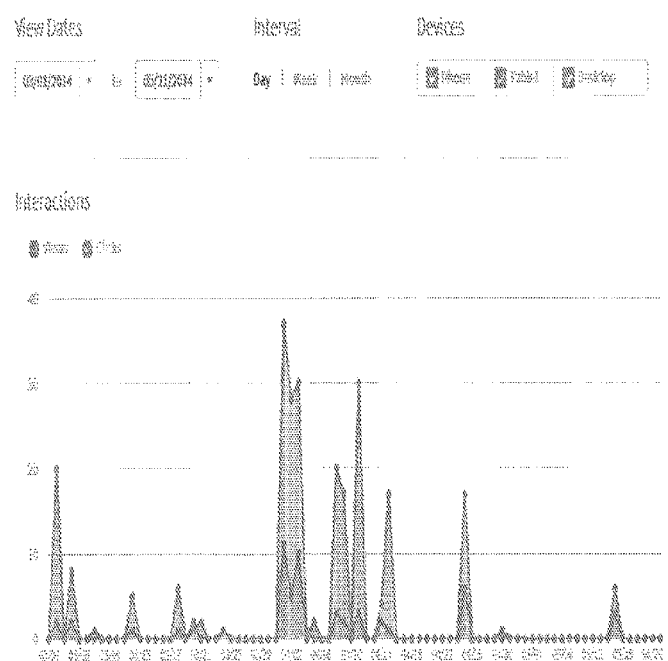
FIG. 9 illustrates an aspect of an exemplary embodiment of the present invention.
Figure 10:
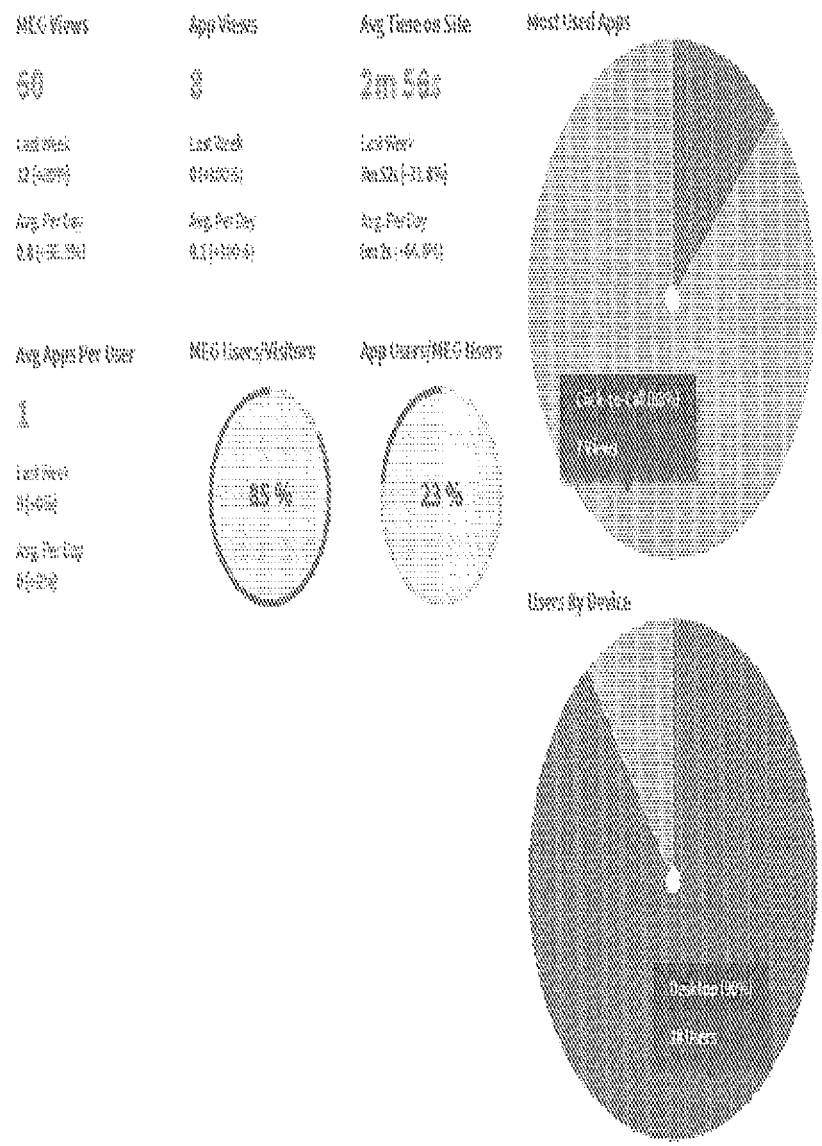
FIG. 10 illustrates an aspect of an exemplary embodiment of the present invention.
Figure 11:
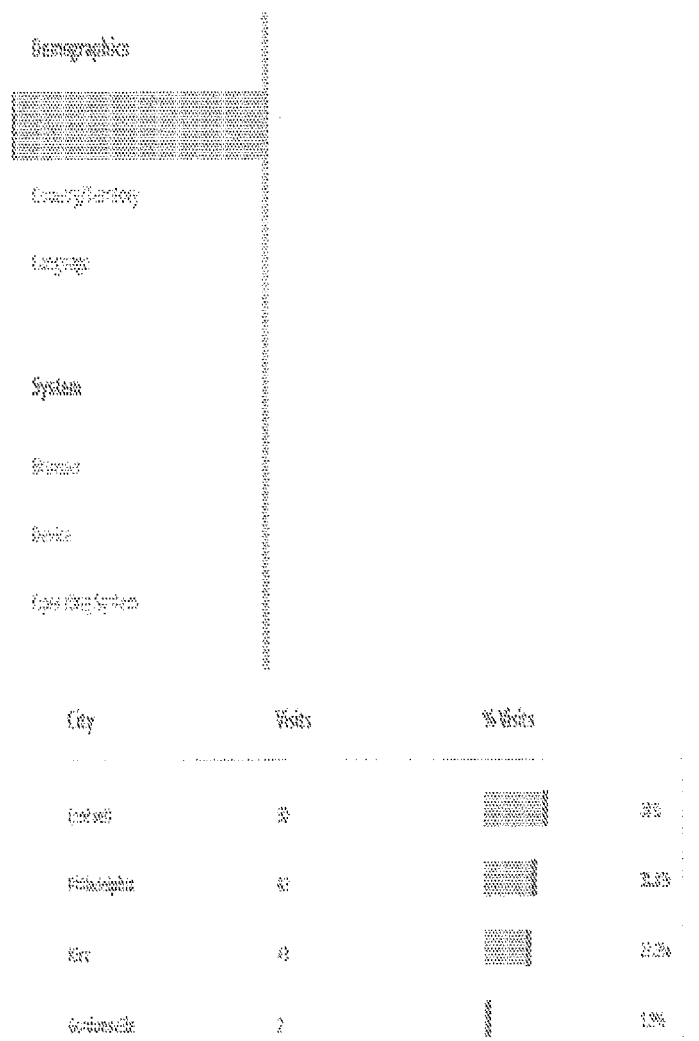
FIG. 11 illustrates an aspect of an exemplary embodiment of the present invention.

As illustrated in FIG. 9, for example, the tracking of analytics may comprise tracks view and/or click over a defined period of time. The data may be filtered by device and may, for example, allow the user to calculate a success rate to optimize interactions and/or click-throughs. Information related to MEG usage may also be presented as illustrated in FIG. 10, for example, wherein the app views/interactions and average time for the same may be calculated. Similarly, the tracking of channels and app deployments may also be provided to facilitate more effective usage with ad campaigns, for example. Targeting demographics, for example, and/or locations may provide for a higher view/interaction rate with a deployed app. As illustrated in FIG. 11, for example, the present invention may provide targeting and/or real-time information which may allow for real-time targeting of apps. Such information, coupled with the use of local beacons, preferably at least one network of beacons, may allow for the targeting of apps and/or channels with a high degree of views/interactions, such as, for example, over 30%.

Figure 12:
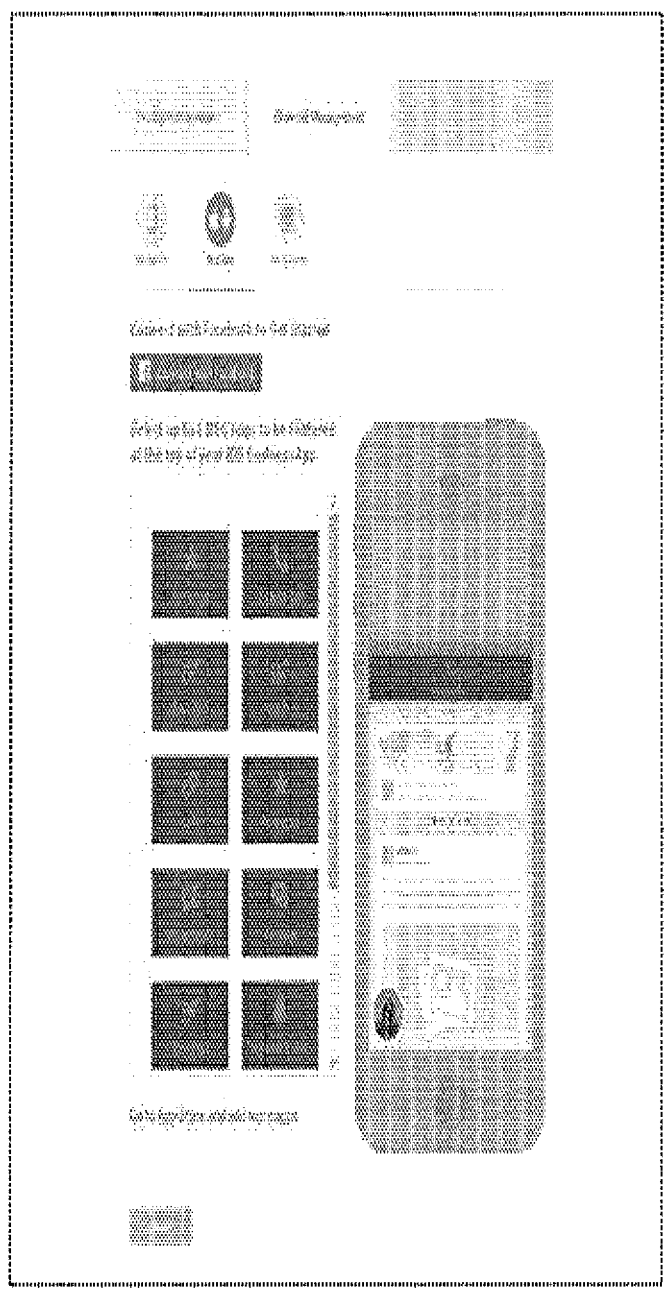
FIG. 12 illustrates an aspect of an exemplary embodiment of the present invention.

The analytics described herein may also provide for engagement by channel and may measure interaction rates with delivered apps, for example. A typical measurement may indicate the following percentage of interaction/redemption, by way of non-limiting example only: 10% of delivered coupons redeemed in-state; 30% of delivered coupons interacted with through native app; 15% of delivered coupons interacted with through Facebook®; and/or 50% of delivered coupons interacted with through a third-party website. Using such information, a user may configure rules related to at least one channel to improve acceptance of The MEG platform 320 may also include, as illustrated in FIG. 12, a developer platform for creating containers which may be deployed as discussed above. Apps may be selected from a list and add to a container by simply dragging and dropping and available app into a MEG associated with a channel. In this way, a user may quickly build functionality into a native app through auto-update functionality provided by the present invention. Similarly, attributes for each app, such as an association with one or more beacons, may be created as well. For example, an app may be associated with a beacon proximate to a prominent painting in a museum which may allow for the deliverance of information to a user in proximity to the painting. Such an association of a MEG, channel, and/or app may be done is real time and may be updated to provide the most current information possible.

Figure 13A:
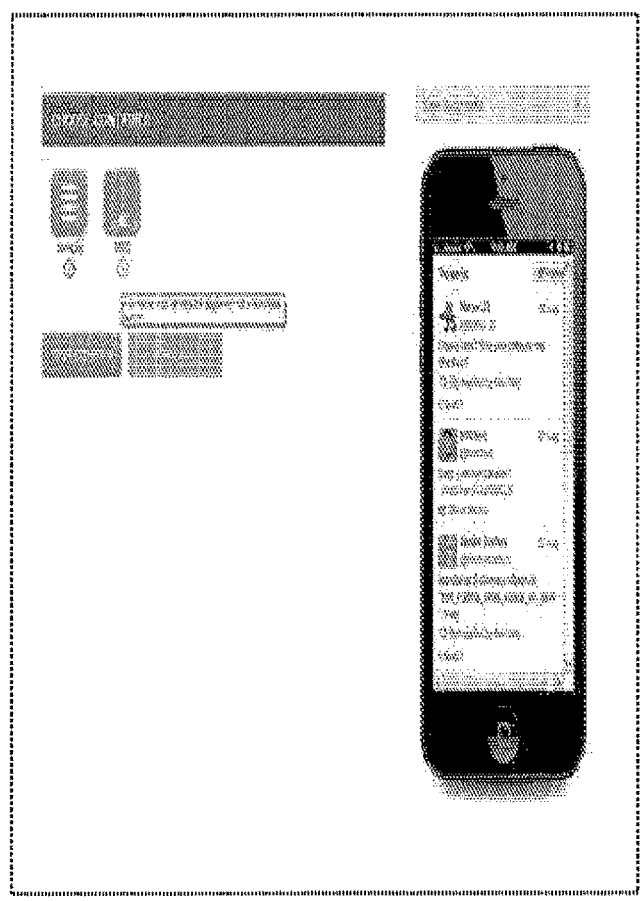
FIGS. 13A-B illustrate aspects of exemplary embodiments of the present invention.
Figure 13B:
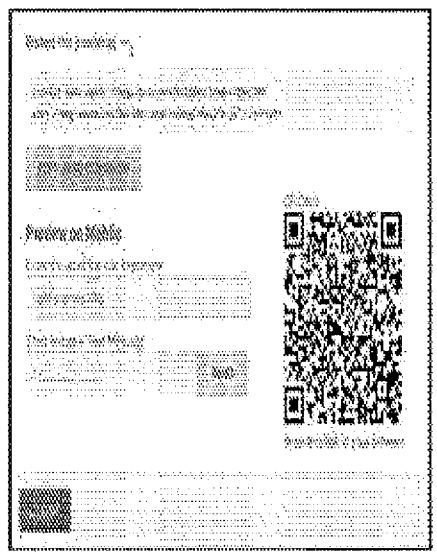

As further illustrated in FIG. 13A, for example, a container type may also be chosen. A published container may also be tracked and may store analytics, as discussed above, for use by the creator of the container, for example. A user may also publish the created container and may be presented with javascript, as illustrated in FIG. 13B, for example, which may be embedded in the desired site location. The present invention may also generate a QR code or other identifier for use by the user.

Figure 14:
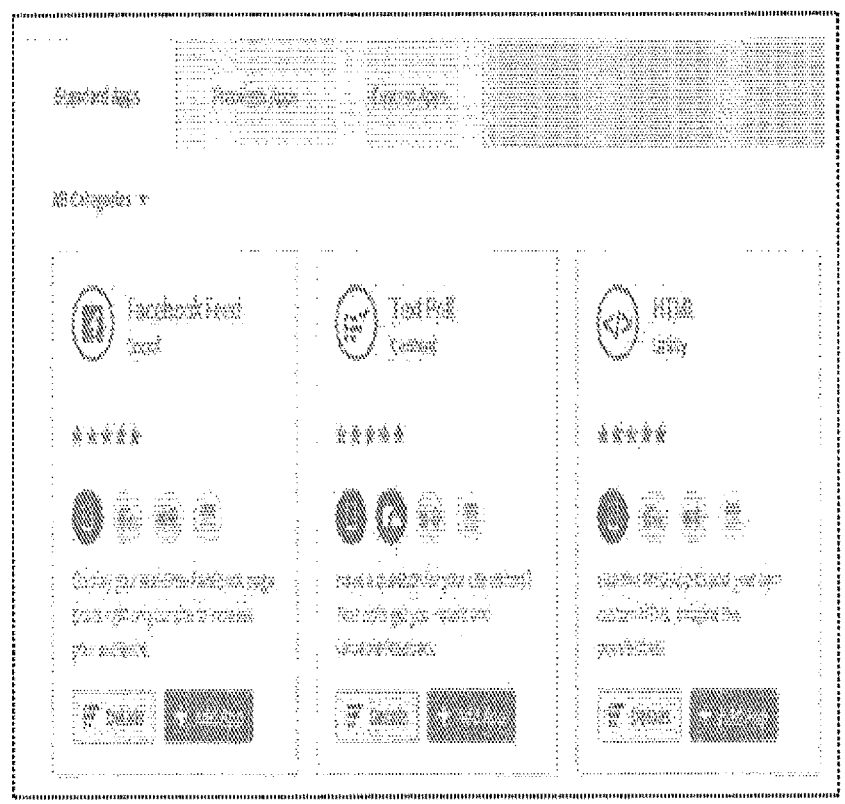
FIG. 14 illustrates an aspect of an exemplary embodiment of the present invention.
Figure 15:
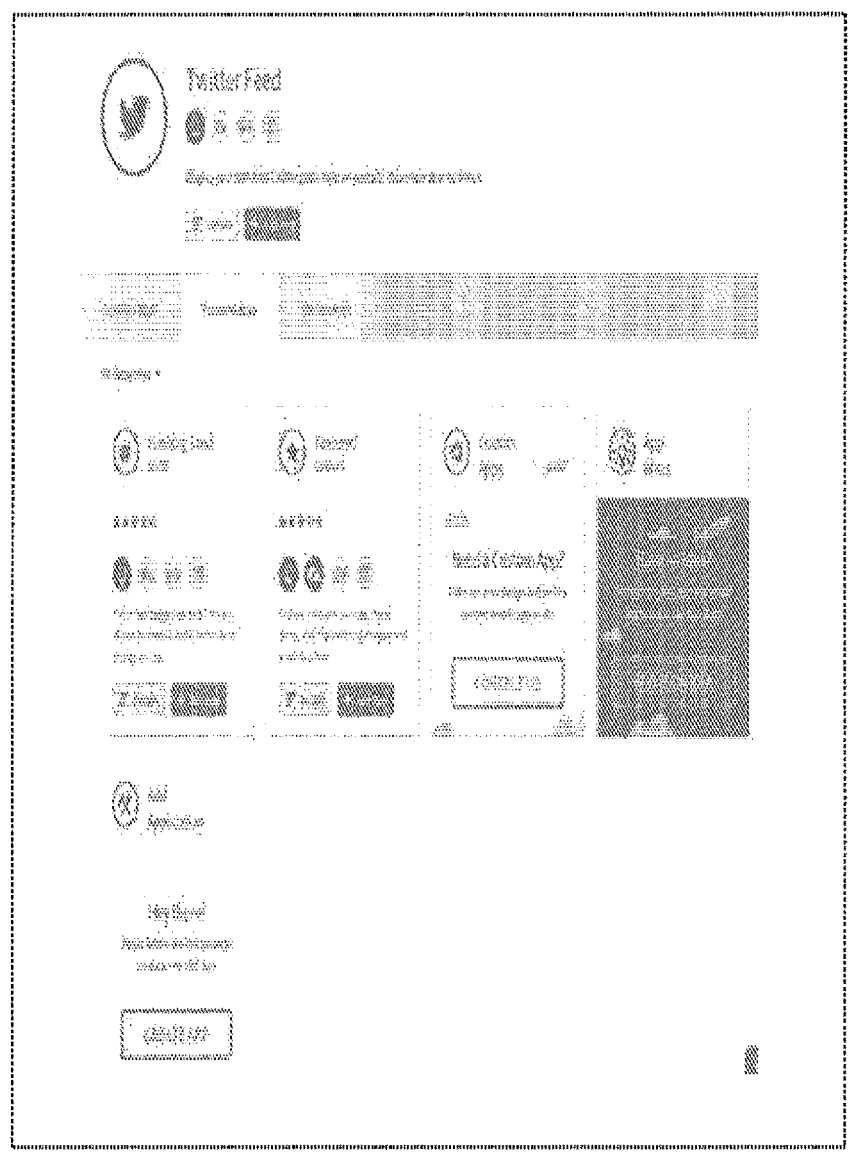
FIG. 15 illustrates an aspect of an exemplary embodiment of the present invention.
Figure 16:
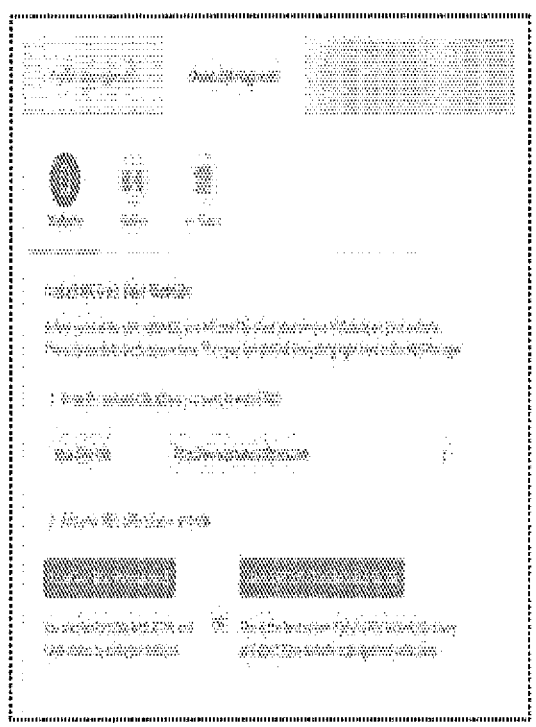
FIG. 16 illustrates an aspect of an exemplary embodiment of the present invention.

As discussed herein, a container may be populated with apps from within or exported into the present invention. In an embodiment of the present invention, the combination of MEGs, containers, and/or apps creates an open API for users to quickly and simply create and distribute functional apps for use with third parties, in particular, target consumers. As illustrated in FIGS. 14-16, the present invention allows for the selection of apps related to social network feeds, apps capable of soliciting feedback; and apps providing an open platform of the use of third-party generated HTML and like code, for example. The present invention also provides at least one portion of anchor code which may be placed in a website to allow for the publication of at least one MEG to that website. In this way, the MEG may facilitate the running of any code within the MEG environment on the third party website and allow for cross-platform apps, providing the creator of such apps great efficiency when deploying and app to a set of users having unknown device types.

Those of skill in the art will appreciate that the herein described systems and methods may be subject to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

What is claimed is:

1. A non-transitory storage medium having a computer program stored thereon, the computer program comprising computer-program code for causing a suitably configured computing system to perform the following when the computer program is executed on the system:
  querying at least one container comprising a plurality of architecturally-developed applications, wherein at least one of the applications comprises a mobile application and is suitable for delivery on, and is context relevant to, a then-resident page in accordance with a plurality of rules comprised of at least ones of container based, time based, location based, device based, and user behavior based rules;
  selecting, agnostically of the then-resident page, of at least one of the at least one applications for providing upon, but un-embedded in, the then-resident page;
  tracking and reporting interactions with, and analytics regarding interactions with, the selected at least one application.

2. The system of claim 1, wherein an icon indicative of the mobile application is displayed as an overlay relative to the page.

3. The system of claim 1, wherein the page is accessible through at least one beacon.

4. The system of claim 1, wherein the at least one application is self-launching.

5. The system of claim 1, wherein at least one URL resident in the at least one application is directed to a non-resident website.

6. The system of claim 1, wherein the at least one application comprises a graphical user interface.

\* \* \* \* \*